(12) United States Patent
Lin et al.

(10) Patent No.: US 12,347,042 B2
(45) Date of Patent: Jul. 1, 2025

(54) AUGMENTED REALITY GUIDING METHOD, APPARATUS, ELECTRONIC DEVICE AND COMPUTER-READABLE STORAGE MEDIUM

(71) Applicant: Lenovo (Beijing) Limited, Beijing (CN)

(72) Inventors: Meizi Lin, Beijing (CN); Ruqing Ban, Beijing (CN); Yinghui Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 183 days.

(21) Appl. No.: 18/180,265

(22) Filed: Mar. 8, 2023

(65) Prior Publication Data
US 2023/0316678 A1    Oct. 5, 2023

(30) Foreign Application Priority Data
Mar. 30, 2022   (CN) .......................... 202210334277.2

(51) Int. Cl.
*G06T 19/00*       (2011.01)
*G06F 3/01*        (2006.01)
*G06V 10/25*       (2022.01)
*G06V 10/44*       (2022.01)
*G06V 10/74*       (2022.01)

(52) U.S. Cl.
CPC ............ *G06T 19/006* (2013.01); *G06F 3/013* (2013.01); *G06V 10/25* (2022.01); *G06V 10/44* (2022.01); *G06V 10/761* (2022.01); *G06V 2201/07* (2022.01)

(58) Field of Classification Search
CPC ... G06T 19/006; G06T 2200/24; G06T 11/60; G06T 13/00; G06F 3/013; G06F 3/011; G06V 10/25; G06V 10/44; G06V 10/761; G06V 2201/07; G06V 40/193; G06V 20/20
See application file for complete search history.

(56) References Cited

U.S. PATENT DOCUMENTS

| | | | |
|---|---|---|---|
| 10,742,935 B2* | 8/2020 | Saptharishi | H04N 23/65 |
| 2016/0350595 A1* | 12/2016 | Solomin | G06V 20/20 |
| 2017/0161958 A1* | 6/2017 | Eilat | G02B 27/017 |
| 2023/0014774 A1* | 1/2023 | Shin | G06V 20/20 |

* cited by examiner

*Primary Examiner* — Said Broome
*Assistant Examiner* — Andrew Shin
(74) *Attorney, Agent, or Firm* — ANOVA LAW GROUP, PLLC

(57) ABSTRACT

An augmented reality (AR) guiding method applied to an AR device includes: obtaining a real-time surrounding image and a focus of a user's line of sight in the real-time surrounding image; determining a guide sign sequence based on the real-time surrounding image; and displaying at least one guide animation based on the guide sign sequence, each guide animation being used to guide the focus of the user's line of sight from a current guide sign to a subsequent guide sign.

19 Claims, 8 Drawing Sheets

AUGMENTED REALITY GUIDING METHOD, APPARATUS, ELECTRONIC DEVICE AND COMPUTER-READABLE STORAGE MEDIUM

CROSS-REFERENCE TO RELATED APPLICATION

This application claims priority to Chinese Patent Application No. 202210334277.2, filed on Mar. 30, 2022, the entire content of which is incorporated herein by reference.

TECHNICAL FIELD

The present disclosure relates to the technical field of electronic device technologies and, more particularly, to an augmented reality guiding method and apparatus, an electronic device, and a computer-readable storage medium.

BACKGROUND

With the advancement of technology, augmented reality (AR) technology has gradually entered the life of users, bringing a brand-new experience to users. AR technology can apply virtual objects to a real environment, such that the real environment and the virtual objects can be superimposed on a same picture or a space in real-time. AR technology and computer vision algorithms may be combined and applied to AR devices. As such, the AR devices are able to perform object recognition and environment recognition on scenes displayed in the AR device, thereby making the AR devices appear more intelligent and sophisticated. Related technologies guide users to observe the environment by displaying two-dimensional (2D) scene images or three-dimensional (3D) scene models that need to be recognized in the AR devices, such as AR glasses. However, this process requires producing 2D scene images or 3D scene models for different scenes, and the workload is heavy. At the same time, due to the small field of view (FOV) of the AR devices, it is difficult to display the 2D scene images or the 3D scene models. Most of the area in the FOV will be occupied, resulting in poor user experience.

SUMMARY

One aspect of the present disclosure provides an augmented reality (AR) guiding method applied to an AR device. The AR guiding method includes: obtaining a real-time surrounding image and a focus of a user's line of sight in the real-time surrounding image; determining a guide sign sequence based on the real-time surrounding image; and displaying at least one guide animation based on the guide sign sequence, each guide animation being used to guide the focus of the user's line of sight from a current guide sign to a subsequent guide sign.

Another aspect of the present disclosure provides an AR guiding device. The AR guiding device includes a memory storing computer instructions and a processor coupled to the memory. When being executed by the processor, the computer instructions cause the processor to: obtain a real-time surrounding image and a focus of a user's line of sight in the real-time surrounding image; determine a guide sign sequence based on the real-time surrounding image; and display at least one guide animation based on the guide sign sequence, each guide animation being used to guide the focus of the user's line of sight from a current guide sign to a subsequent guide sign.

Another aspect of the present disclosure provides a computer-readable storage medium storing computer instructions. When being executed by a processor, the computer instructions cause the processor to: obtain a real-time surrounding image and a focus of a user's line of sight in the real-time surrounding image; determine a guide sign sequence based on the real-time surrounding image; and display at least one guide animation based on the guide sign sequence, each guide animation being used to guide the focus of the user's line of sight from a current guide sign to a subsequent guide sign.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

In the following description, references to "some embodiments" describe a subset of all possible embodiments, but it is understood that "some embodiments" may be the same subset or a different subset of all possible embodiments, and may be combined with each other under the circumstances of no conflict.

It should be noted that terms such as "first\second\third" in the embodiments of the present disclosure are merely used to distinguish similar objects, and do not represent a specific ordering of objects. Understandably, whenever permitted, specific orders or sequences of "first\second\third" objects/events may be interchanged such that the embodiments of the present disclosure described herein can be practiced in sequences other than those illustrated or described herein.

Those skilled in the art should understand that unless otherwise defined, all terms (including technical terms and scientific terms) used herein have the same meanings as being understood by those of ordinary skill in the art to which the embodiments of the present application belong. It should also be understood that terms, such as those defined in commonly used dictionaries, should be understood to have meanings consistent with their meaning in the context of the prior art. Unless specifically defined as herein, such terms are not intended to be idealized or overly interpreted.

Figure 1A:
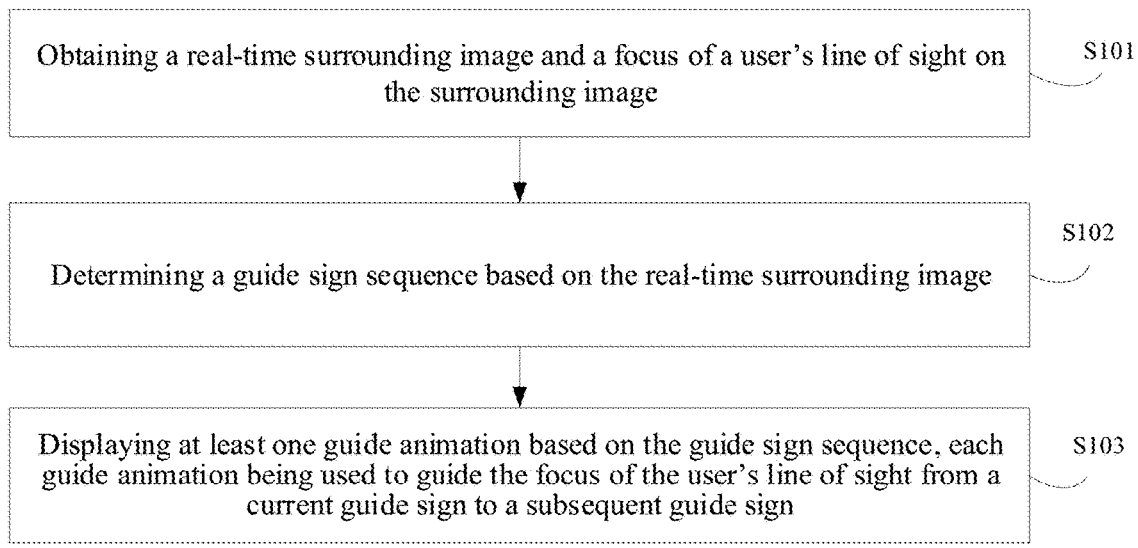
FIG. 1A is a flowchart of an exemplary AR guiding method according to some embodiments of the present disclosure.

FIG. 1A is a flowchart of an exemplary AR guiding method according to some embodiments of the present disclosure. As shown in FIG. 1A, the AR guiding method includes the following processes.

At S101, a real-time surrounding image and a focus of a user's line of sight on the surrounding image are obtained.

In some embodiments, the real-time surrounding image is a surrounding image captured in real-time by a camera of an AR device within a field of view (FOV) of the camera of the AR device. For example, the AR device turns on the camera to capture the surrounding image in real-time for scene recognition. The surrounding image includes objects surrounding the AR device and captured by the camera. For example, the objects may include equipment on a production line, to-be-produced products, and safety signages and production taglines on the production line.

Figure 1B:
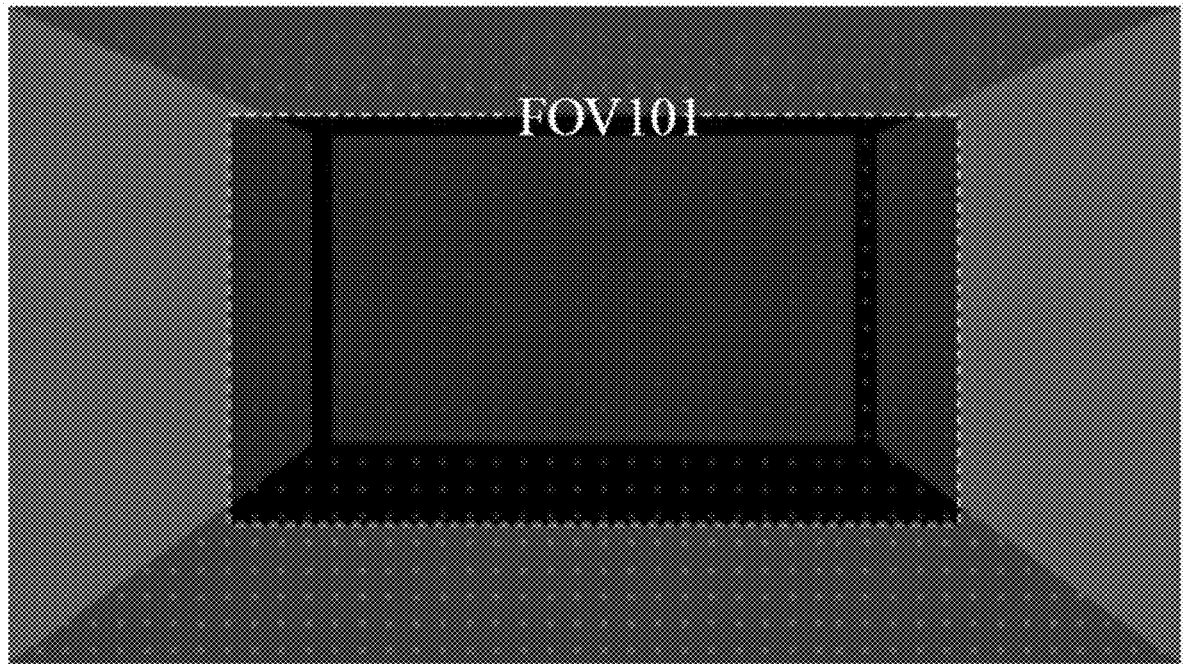
FIG. 1B is a schematic diagram showing an application scene of an exemplary AR guiding method according to some embodiments of the present disclosure.

In some embodiments, the focus of the user's line of sight may be any point in the FOV. For example, as shown in FIG. 1B, after the scene recognition starts, a focus point for visual recognition appears at a center of the FOV to guide the focus of the user's line of sight.

At S102, a guide sign sequence is determined based on the real-time surrounding image.

In some embodiments, a guide sign in the guide sign sequence is used to guide the focus of the user's line of sight to stay in an area with a high density of surrounding feature points in the surrounding image, thereby improving user's AR experience. In some embodiments, the surrounding feature points include edges, corners, and blobs of the equipment on the production line, the to-be-produced products, and the safety signages and production taglines on the production line.

In some embodiments, determining the guide sign sequence based on the real-time surrounding image includes: dividing the real-time surrounding image into at least one image area, determining a density of the surrounding feature points in the at least one image area, and determining the guide sign sequence based on the density.

Figure 1C:
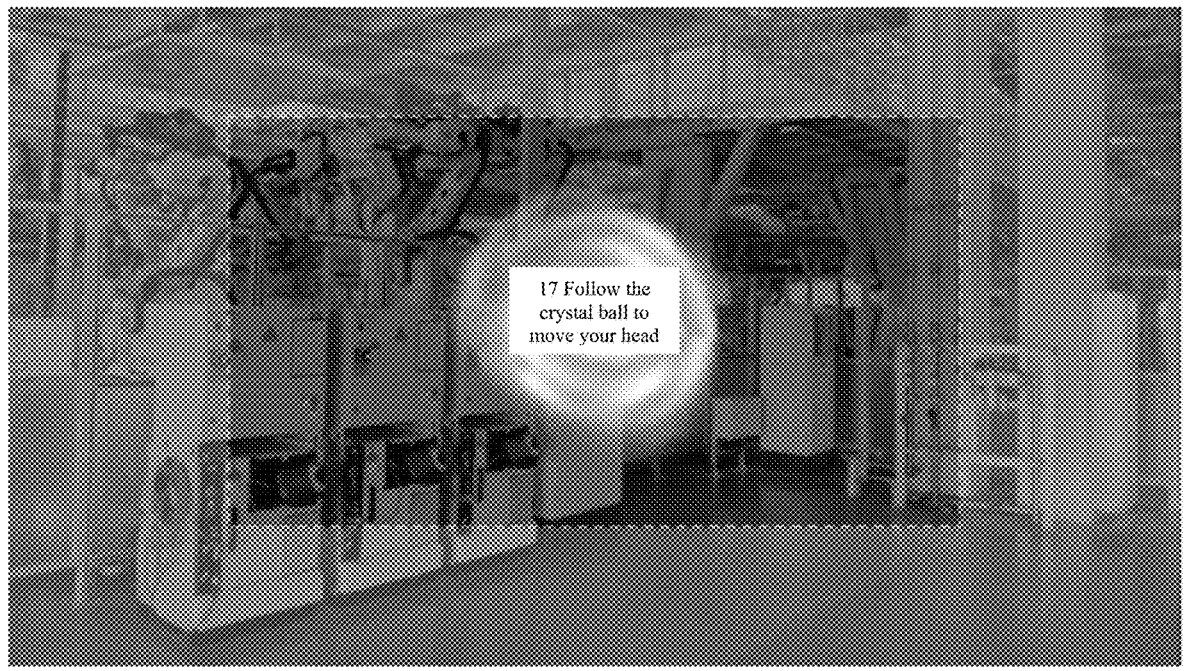
FIG. 1C is a schematic diagram showing another application scene of an exemplary AR guiding method according to some embodiments of the present disclosure.
Figure 1D:
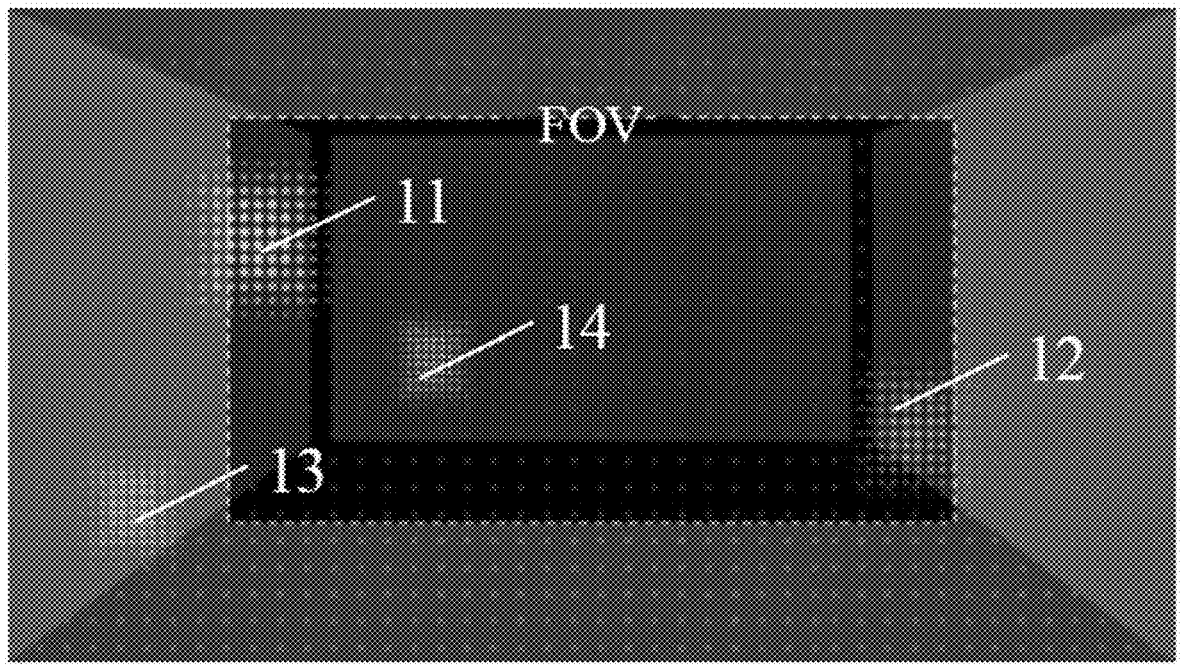
FIG. 1D is a schematic diagram showing another application scene of an exemplary AR guiding method according to some embodiments of the present disclosure.
Figure 1E:
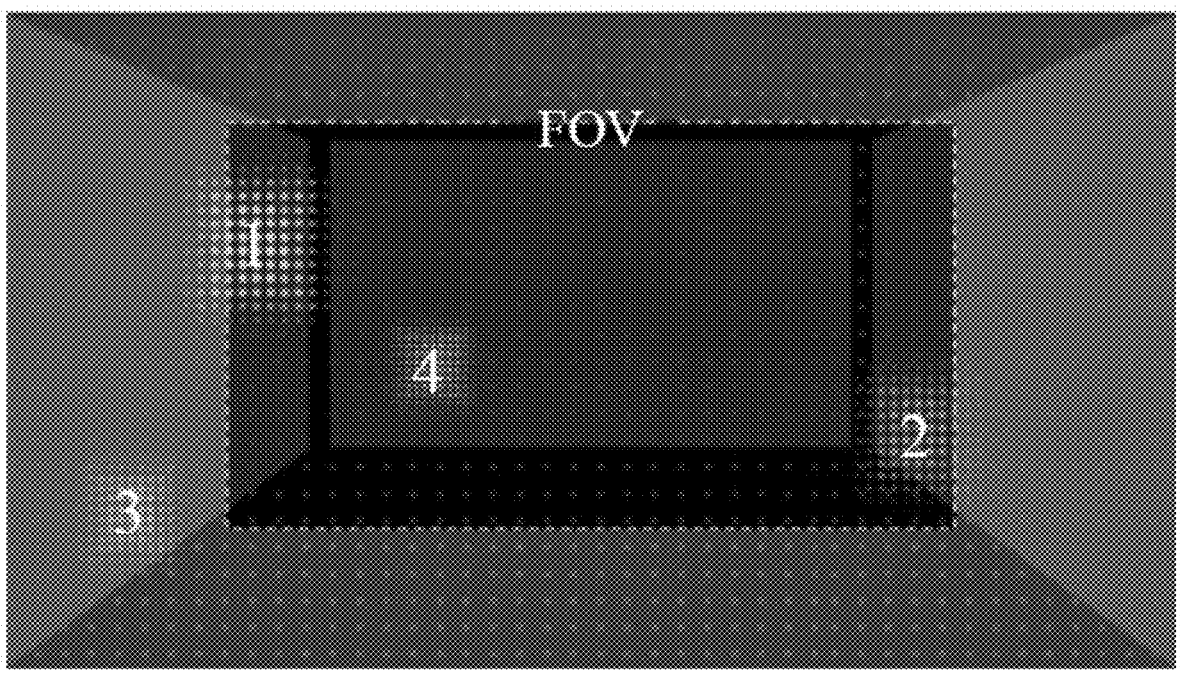
FIG. 1E is a schematic diagram showing another application scene of an exemplary AR guiding method according to some embodiments of the present disclosure.

For example, as shown in FIG. 1D, the surrounding image includes four image areas: an image area 11, an image area 12, and an image area 13, and an image area 14. The four image areas are arranged according to their high-to-low densities of the surrounding feature points as the image area 11, the image area 12, and the image area 13, and the image area 14. As shown in FIG. 1E, the guide sign sequence includes a sign 1 in the image area 11, a sign 2 in the image area 12, a sign 3 in the image area 13, and a sign 4 in the image area 14.

At S103, based on the guide sign sequence, at least one guide animation is displayed. Each guide animation is used to guide the focus of the user's line of sight from a current guide sign to a subsequent guide sign.

Figure 1F:
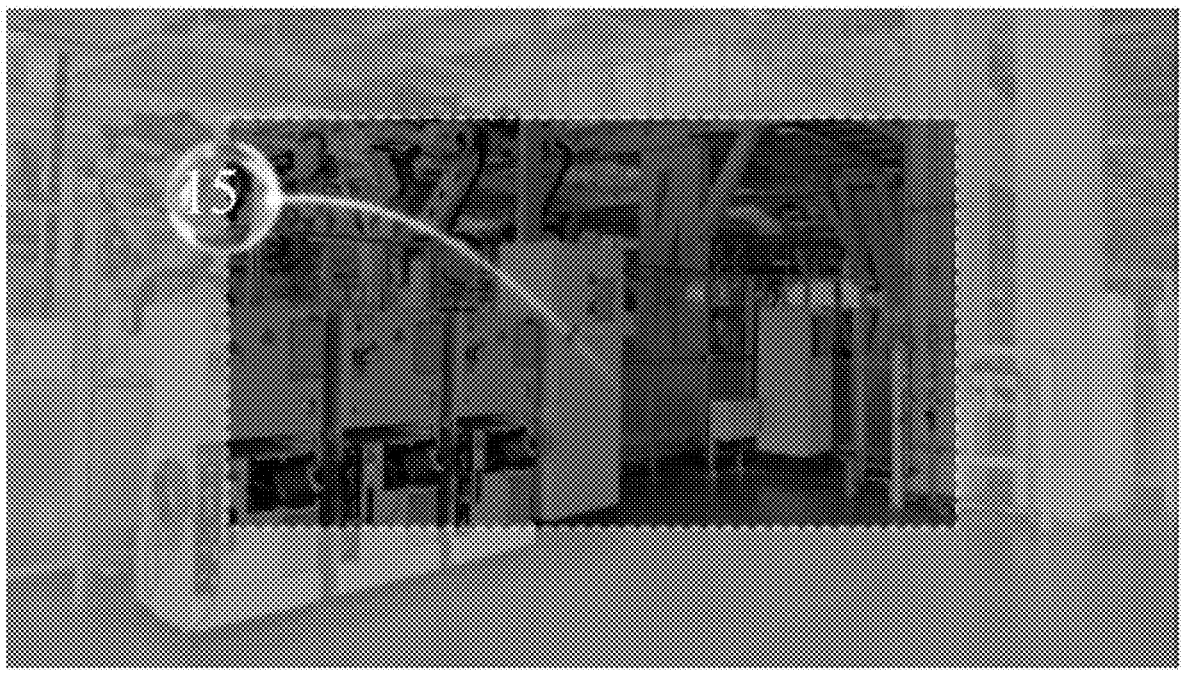
FIG. 1F is a schematic diagram showing another application scene of an exemplary AR guiding method according to some embodiments of the present disclosure.
Figure 1G:
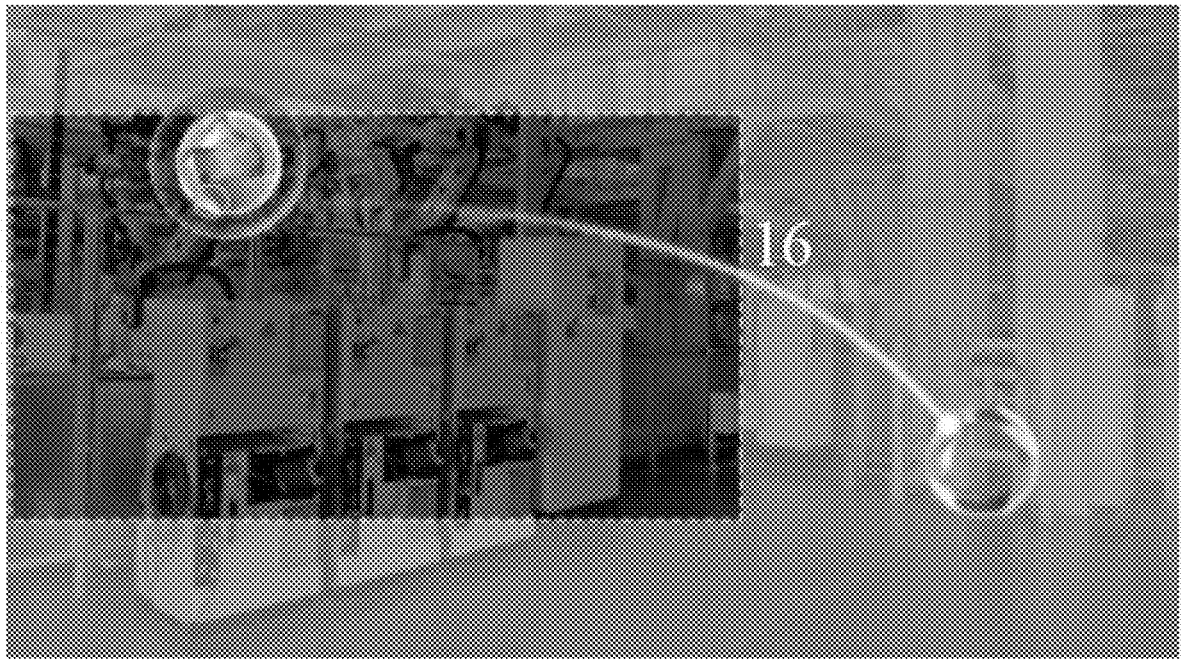
FIG. 1G is a schematic diagram showing another application scene of an exemplary AR guiding method according to some embodiments of the present disclosure.

In some embodiments, the guide animation is an animation effect on a user interface (UI). In one example, as shown in FIG. 1F, the animation effect is a circle 15 displayed in the image area. In another example, as shown in FIG. 1G, the animation effect is an arc 16 instructing a user to move the focus of the user's line of sight from the sign 1 to the sign 2.

In the embodiments of the present disclosure, the guide sign sequence is determined based on the real-time surrounding image. The at least one guide animation is displayed based on the guide sign sequence. Each guide animation is used to instruct the user to move the focus of the user's line of sight from a current guide sign to a subsequent guide sign. As such, on one hand, the guide animation is displayed to guide the focus of the user's line of sight to observe an area having the high density of the surrounding feature points in the real-time surrounding image, thereby improving the user's visual experience. On the other hand, the displayed guide animation guides the user. No 2D scene image or 3D scene model needs to be added for instructions. Workload of image editing and production is reduced and a display screen is less crowded. An efficiency of scene recognition is improved. Thus, the user experience of AR scene recognition is improved.

Figure 2:
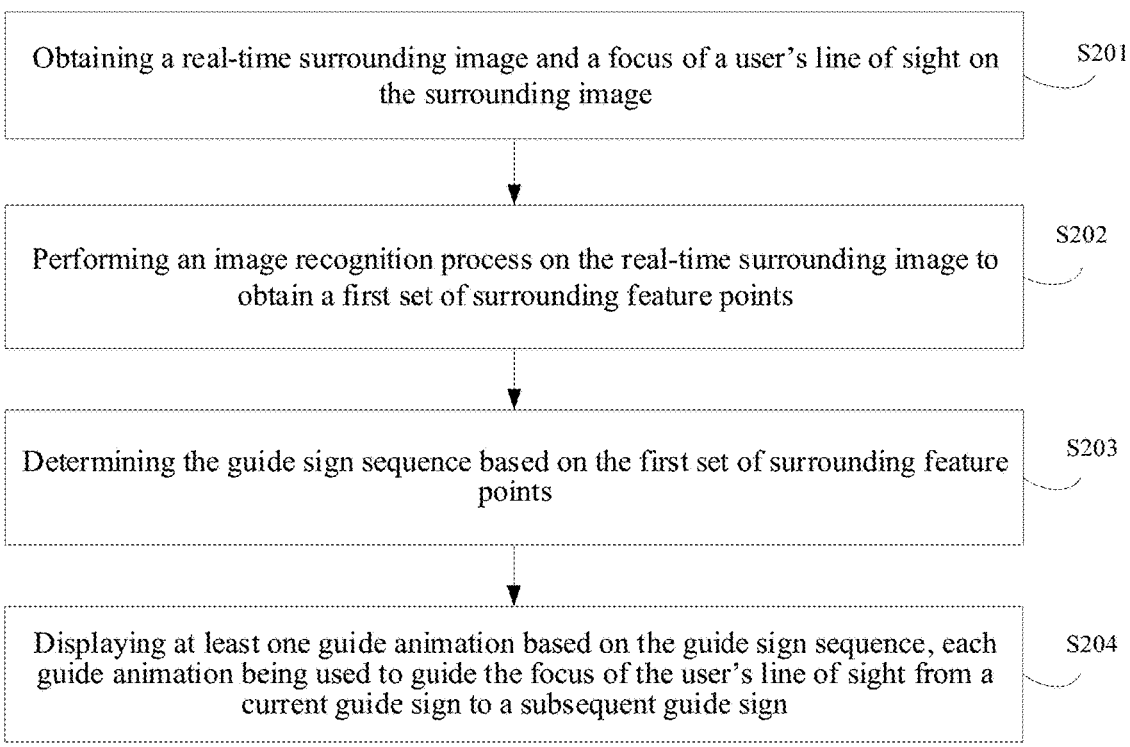
FIG. 2 is a flowchart of another exemplary AR guiding method according to some embodiments of the present disclosure.

FIG. 2 is a flowchart of another exemplary AR guiding method according to some embodiments of the present disclosure. As shown in FIG. 2, the AR guiding method includes the following processes.

At S201, a real-time surrounding image and a focus of a user's line of sight on the surrounding image are obtained.

At S202, an image recognition process is performed on the real-time surrounding image to obtain a first set of surrounding feature points.

In some embodiments, the image recognition process may be performed through a deep learning method to obtain the first set of surrounding features points. For example, a convolutional neural network may be used to perform a residual network learning on the real-time surrounding image to recognize feature points such as edges and corners of the signs generated in the scene.

At S203, the guide sign sequence is determined based on the first set of surrounding feature points.

In some embodiments, a 2D image plane may be reconstructed through the first set of surrounding feature points. The reconstructed 2D image plane is divided into at least one image area. One guide sign is generated in each of the at least one image area. A density of surrounding feature points corresponding to each image area is determined. Based on the density, the at least one guide sign is sorted to obtain the guide sign sequence.

In some embodiments, the surrounding feature points in the first set of surrounding feature points are screened to obtain a second set of surrounding feature points. Based on the second set of surrounding feature points, the guide sign sequence is determined.

At S204, based on the guide sign sequence, at least one guide animation is displayed. Each guide animation is sued to guide the focus of the user's line of sight from the current guide sign to the subsequent guide sign.

In the embodiments of the present disclosure, the image recognition process is performed on the real-time surrounding image to obtain the first set of surrounding feature points. Based on the first set of surrounding feature points, the guide sign sequence is determined. Thus, the user is guided to view the image area that is rich in the surrounding feature points, thereby improving scene recognition efficiency.

Figure 3:
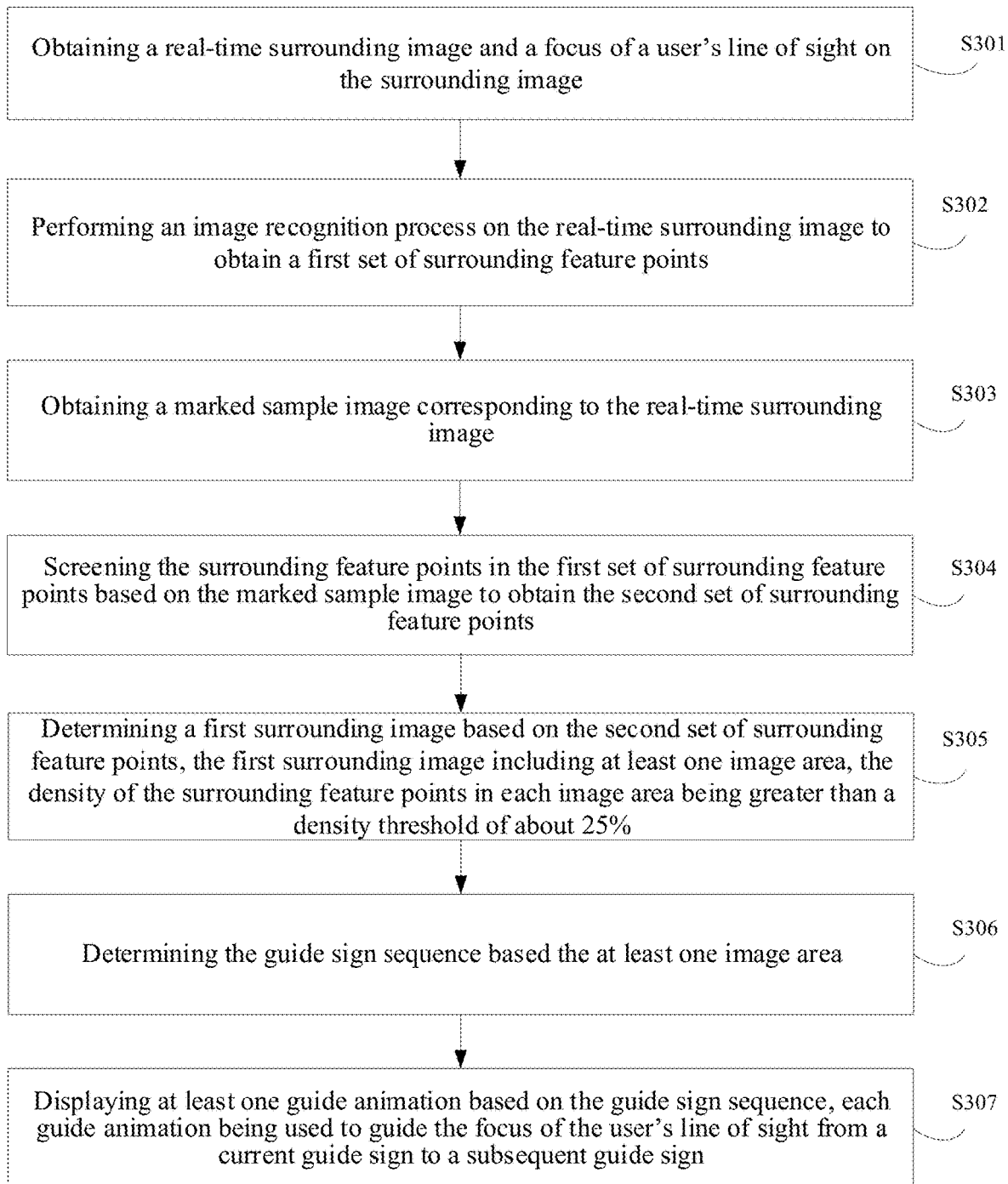
FIG. 3 is a flowchart of another exemplary AR guiding method according to some embodiments of the present disclosure.

FIG. 3 is a flowchart of another exemplary AR guiding method according to some embodiments of the present disclosure. As shown in FIG. 3, the AR guiding method includes the following processes.

At S301, the real-time surrounding image and the focus of the user's line of sight in the surrounding image are obtained.

At S302, the image recognition process is performed on the real-time surrounding image to obtain the first set of surrounding feature image.

At S303, a marked sample image corresponding to the real-time surrounding image is obtained.

In some embodiments, the marked sample image may be a sample surrounding image marked with the surrounding feature points. For example, the marked sample image may be an image marked with the edges and the corners in the production taglines.

At S304, based on the marked sample image, the surrounding feature points in the first set of surrounding feature points are screened to obtain the second set of surrounding feature points.

In some embodiments, S304 further includes the following processes.

At S3041, a feature descriptor of each surrounding feature point in the marked sample image is determined to obtain a first set of feature descriptors.

In some embodiments, the feature descriptor is a vector used to describe a feature point. For example, when describing a corner feature point, the feature descriptor includes a vector of parameters such as an angle.

In some embodiments, each feature descriptor in the first set of feature descriptors is used to correspondingly describe each surrounding feature point in the marked sample image.

At S3042, the feature descriptor of each surrounding feature point in the first set of surrounding feature points is determined to obtain a second set of feature descriptors.

At S3043, a similarity between each feature descriptor in the first set of feature descriptors and each feature descriptor in the second set of feature descriptors is determined.

In some embodiments, the marked sample image and the real-time surrounding image at a same scene may be matched by the similarity calculation. Each feature descriptor in the marked sample image and each feature descriptor in the real-time surrounding image are compared. For example, an Euclidean distance between the feature descriptors are calculated. A pair of feature descriptors with a highest score may be two closest surrounding feature points, corresponding to a most matched feature.

At S3044, each surrounding feature point whose similarity satisfies a predetermined similarity threshold is determined as an element in the second set of surrounding feature points.

In some embodiments, the feature points whose similarities are greater than the predetermined similarity threshold are retained, and the feature points whose similarities do not satisfy the predetermined similarity threshold are screened out. As such, the surrounding feature points whose similarities do not satisfy the predetermined similarity threshold are filtered out, and only the surrounding feature points whose similarities are high are retained. Thus, the second set f surrounding feature points are obtained.

At S305, based on the second set of surrounding feature points, a first surrounding image is determined. The first surrounding image includes at least one image area. The density of the surrounding feature points in each image area is greater than a density threshold of about 25%.

In some embodiments, S305 further includes the following processes.

At S3051, based on the second set of surrounding feature points, a second surrounding image is reconstructed.

For example, the surrounding feature point data in the second surrounding feature points may be used to establish a 2D image plane. The surrounding feature points whose similarities are low are filtered out from the 2D image plane. Thus, the non-marked surrounding feature points are filtered out.

At S3052, the second surrounding image is divided into at least one image area.

In some embodiments, after the 2D image plane is divided, an index may be added to each image area, such that different image areas may be referenced by their indexes.

At S3053, a density of surrounding feature points is determined in each of the at least one image area.

At S3054, each image area whose density of the surrounding feature points is greater than the density threshold is determined as the image area of the first surrounding image.

In some embodiments, a non-core image area may be filtered through a sparsity calculation. Based on a density clustering algorithm, core image areas whose densities of the surrounding feature points satisfy the density threshold are further aggregated and boundary optimized. Edge samples and image noises are filtered. Thus, the image areas with dense surrounding feature points on the 2D image are obtained.

At S306, based the at least one image area, the guide sign sequence is determined.

In some embodiments, each image area corresponds to one guide sign. S306 further includes the following processes.

At S3061, the at least one image area is sorted based on the density of surrounding feature points in each image area to obtain an observation order of the at least one image area.

At S3062, based on the observation order, an order of the guide signs is determined to obtain the guide sign sequence.

At S307, based on the guide sign sequence, at least one guide animation is displayed. Each guide animation is used to guide the focus of the user's line of sight from the current guide sign to the subsequent guide sign.

For example, through the densities of the surrounding feature points in the image areas, each image area is sorted from high density to low density to determine the order of the guide signs and obtain the guide sign sequence from dense to sparse. Thus, the animation effect on the UI is updated in real-time to guide the user to observe the corresponding image area according to the guide sign sequence, and guide the user to view in a direction that is rich in surrounding feature points, thereby effectively improving an accuracy of scene recognition.

In the embodiments of the present disclosure, the surrounding feature points in the first set of surrounding feature points are screened based on the marked sample image to obtain the second set of surrounding feature points. The first surrounding image is determined based on the second set of surrounding feature points. The first surrounding image includes at least one image area. The density of the surrounding feature points in each image area is greater than the density threshold. The guide sign sequence is determined based on the at least one image area. As such, through screening of the surrounding feature points and screening of image areas, the image areas with sparse feature points are filtered out, the image noise is reduced, and the image areas with dense feature points are obtained. Thus, the user is guided to observe in the direction of rich surrounding feature points, the guide effectiveness is improved, and the user experience of scene recognition is optimized.

Figure 4A:
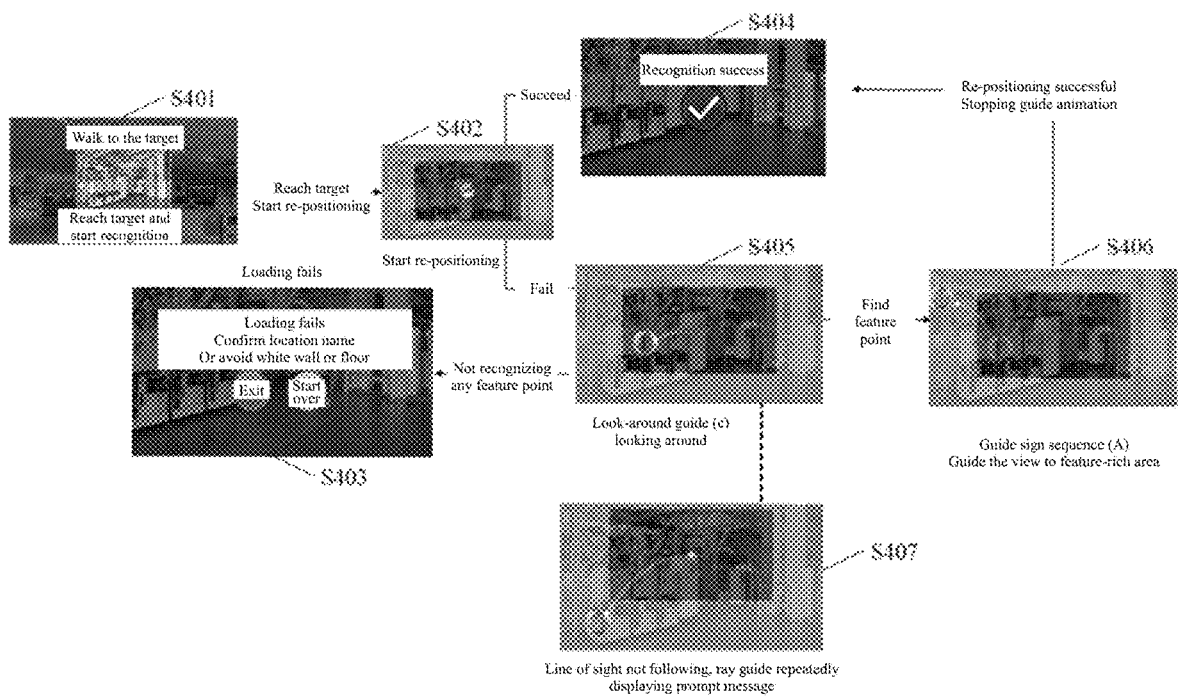
FIG. 4A is a flowchart of another exemplary AR guiding method according to some embodiments of the present disclosure.

FIG. 4A is a flowchart of another exemplary AR guiding method according to some embodiments of the present disclosure. As shown in FIG. 4A, the AR guiding method includes the following processes.

At S401, a target position of the focus of the user's line of sight is obtained.

At S402, a surrounding image at the target position is obtained.

At S403, when no surrounding feature point is detected in the surrounding image at the target position, a prompt message of moving the position is outputted.

Figure 4B:
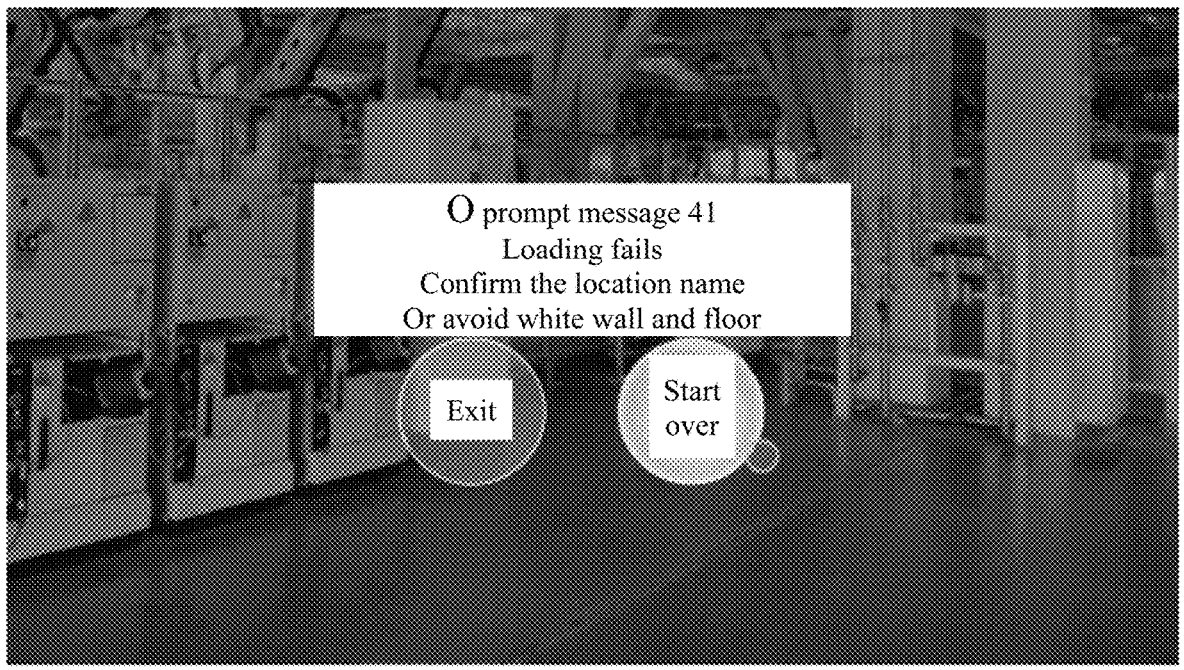
FIG. 4B is a schematic diagram showing another application scene of an exemplary AR guiding method according to some embodiments of the present disclosure.

For example, as shown in FIG. 4B, when the density of the surrounding feature points in the real-time surrounding image is low, the prompt message 41 is displayed to notify a load failure and to guide the user to move the position.

In some embodiments, the AR guiding method further includes the following processes.

At S404, when it is detected that the focus of the user's line of sight coincides with the target position, a prompt message of successful positioning is outputted.

At S405, the real-time surrounding image and the focus of the user's line of sight in the surrounding image are obtained.

At S406, the guide sign sequence is determined based on the real-time surrounding image.

In some embodiments, the AR guiding method further includes: based on the guide sign sequence, displaying at least one guide animation, where each guide animation is used to guide the focus of the user's line of sight from the current guide sign to the subsequent guide sign.

In some embodiments, the AR guiding method further includes: when the focus of the user's line of sight is moved from the current guide sign to the subsequent guide sign, the surrounding recognition is successful, and displaying the guide animation is stopped.

At S407, when the focus of the user's line of sight is not moved from the current guide sign to the subsequent guide sign, at least one guide animation is displayed repeatedly.

In the embodiments of the present disclosure, through repeatedly displaying the at least one guide animation when the focus of the user's line of sight is not moved from the current guide sign to the subsequent guide sign, a movement direction of the user's line of sight is prompted repeatedly, and the user experience of scene recognition is improved.

With the advancement of technology, AR technology gradually enters the lives of users, bringing users a brand-new experience. AR technology can apply virtual objects to the real environment, such that the real environment and virtual objects can be superimposed on a same image or space in real-time. Combining AR technology with computer vision algorithms to apply to AR devices facilitates performing object recognition and environment recognition on scenes displayed in the AR devices, thereby making the AR devices appear more intelligent and sophisticated. Related technologies guide users to observe the environment by displaying 2D scene images or three-dimensional (3D) scene models that need to be recognized in the AR devices, such as AR glasses.

However, this process requires producing 2D scene images or 3D scene models for different scenes, and the workload is heavy. At the same time, due to the small FOV of the AR devices, it is difficult to display the 2D scene images or the 3D scene models. Most of the area in the FOV will be occupied, resulting in poor user experience.

Figure 5:
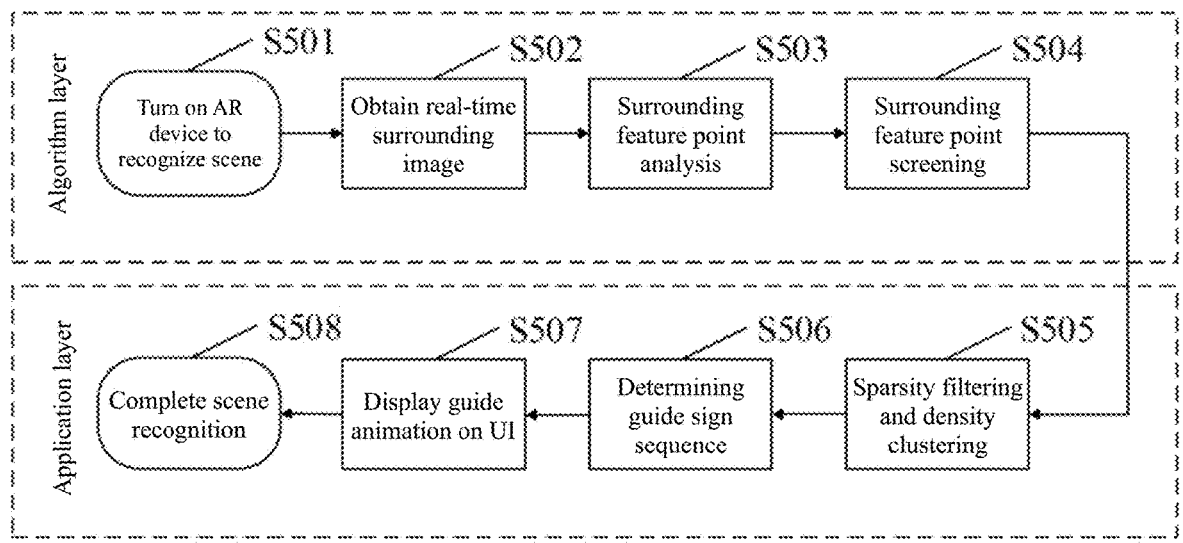
FIG. 5 is a flowchart of another exemplary AR guiding method according to some embodiments of the present disclosure.

To solve the above-described problems, the present disclosure provides an AR guiding method, which is applied to an AR device. As shown in FIG. 5, the AR guiding method includes the following processes.

At S501, the AR device is turned on to start to recognize a scene.

At S502, a real-time surrounding image is obtained.

At S503, surrounding feature points in the real-time surrounding image are analyzed.

In some embodiments, the surrounding feature points in the real-time surrounding image are analyzed to obtain a first set of surrounding feature points.

In some embodiments, S503 further includes: per forming an image recognition process on the real-time surrounding image to obtain the first set of surrounding feature points.

At S504, the surrounding feature points are screened.

In some embodiments, the surrounding feature points in the first set of surrounding feature points are screened to obtain a second set of surrounding feature points.

At S505, sparsity filtering and density clustering are performed on the first set of surrounding feature points.

In some embodiments, the sparsity filtering and density clustering are performed on the first set of surrounding feature points to obtain the second set of surrounding feature points.

At D506, a guide sign sequence is determined.

At S507, a guide animation is displayed on a UI.

At S508, a scene recognition process is completed.

In some embodiments, S501 to S505 are implemented in an algorithm layer, and S505 to S508 are implemented in an application layer.

In some embodiments, the algorithm layer includes the following processes. When starting to recognize the scene, the AR device turns on the camera to capture a real-time surrounding image. The real-time surrounding image includes surroundings of the AR device captured by the camera, for example, equipment on a production line, to-be-produced products, and safety signages and production taglines on the production line. A deep learning process is performed on the real-time surrounding image to obtain surrounding feature points, such as edges, corners, and blobs. A feature descriptor is extracted from each surrounding feature point. Then, a matching process is performed on each surrounding feature point. Through Euclidean distance comparison, the surrounding feature points with an Euclidean distance comparison result not satisfying a distance threshold are filtered out, and the surrounding feature points with the Euclidean distance comparison result satisfying the distance threshold are retained. Thus, the second set of surrounding feature points are obtained.

In some embodiments, the application layer includes the following processes. The second set of surrounding feature points are obtained in real-time from the algorithm layer. The surrounding feature point data in the second set of surrounding feature points are used to establish a 2D image plane. The 2D image plane is divided into a plurality of image areas. Each of the plurality of image areas is indexed. Non-core image areas are filtered out through calculation of sparsity. Based on a density clustering algorithm, core image areas whose densities of the surrounding feature points satisfy the density threshold are further aggregated and boundary optimized. Edge samples and image noises are filtered. Thus, the image areas with dense surrounding feature points on the 2D image are obtained. Through the densities of the surrounding feature points in the plurality of image areas, each image area is sorted from high density to low density to determine the order of the guide signs and obtain the guide sign sequence from dense to sparse. Thus, the animation effect on the UI is updated in real-time to guide the user to observe the corresponding image area according to the guide sign sequence, and guide the user to view in the direction that is rich in surrounding feature points, thereby effectively improving the accuracy of scene recognition, and at the same time optimizing the user experience of scene recognition.

In some embodiments, as shown in FIG. 1B, when the scene recognition is started, a focus point for visual recognition appears at the center of FOV 101 to guide the focus of the user's line of sight. At the same time, the algorithm layer starts to analyze the real-time surrounding image, obtains the surrounding feature points, and transmits the surrounding feature points to the application layer. The guide animation is shown as circle 17 in FIG. 1C.

In some embodiments, through a look-around guide, a current surrounding quality is determined. At the same time, the user is allowed to complete a left and right head movement naturally. In the look-around guide, a type of information displayed in the surrounding image is type C or following the FOV. According to the obtained order of the surrounding feature point densities, the application layer selects the position of the highest density as a starting point of the guide sign, and displays the guide animation in the UI. After the user focuses on the guide animation, the guide animation guides to a diagonal position.

Figure 6:
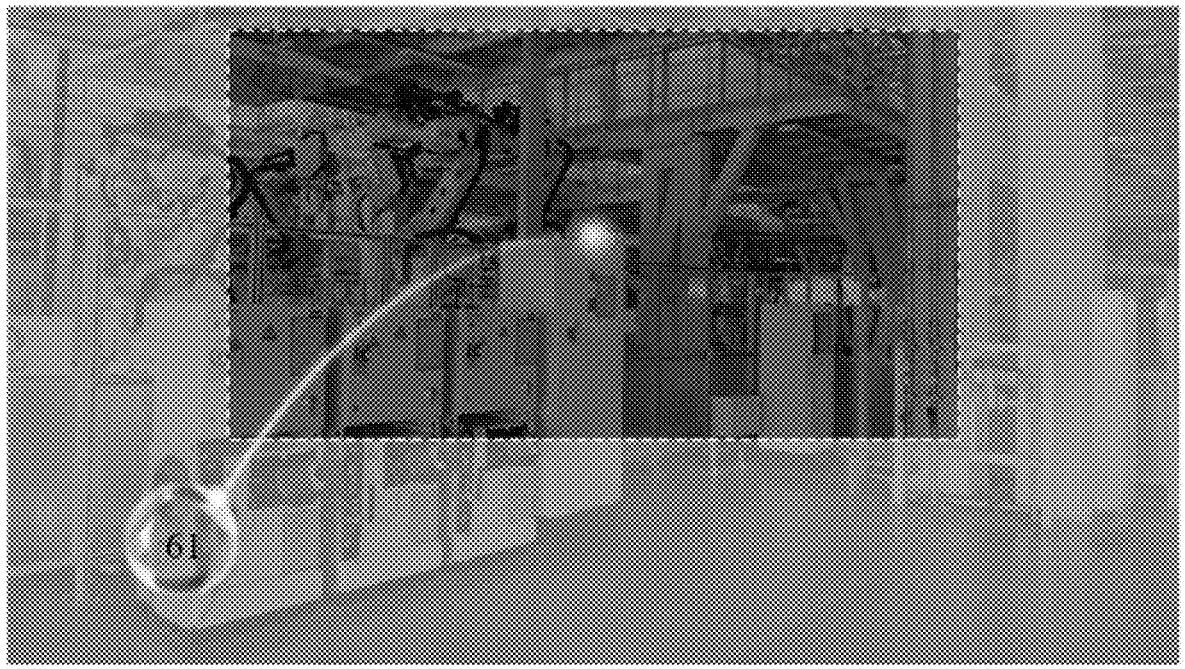
FIG. 6 is a schematic diagram showing another application scene of an exemplary AR guiding method according to some embodiments of the present disclosure.

In some embodiments, during the look-around process, an area of the user's line of sight is expanded. After the look-around process is completed, a subsequent guide position is determined according to newly expanded surrounding feature point densities, and the user is guided to follow the guide animation on the UI to view a feature-rich area. The type of information displayed in the surrounding image is type A or following the space. Within a range of 120° front viewing angle, as shown in FIG. 6, a circle 61 appears in the space according to feedback of the surrounding feature points. The focus of the user's line sight is guided to move. If the user does not follow the view, a guide animation ray starts to guide repeatedly after 2 seconds.

In some embodiments, through performing the image recognition process on the real-time surrounding image or a surrounding recognition process, the surrounding feature points are obtained. The surrounding feature points are filtered. The filtered feature points are displayed on a screen through a UI design. The user is guided to view feature-rich positions, thereby improving the user experience.

In addition, the present disclosure also provides an AR guiding device. The AR guiding device includes a controller. The controller is implemented by a processor in the electronic device (i.e., the AR guiding device). The controller may also be implemented by logic circuits. In some embodiments, the processor may be a central processing unit (CPU), a micro processing unit (MPU), a digital signal processor (DSP), or a field programmable gate array (FPGA), etc.

Figure 7:
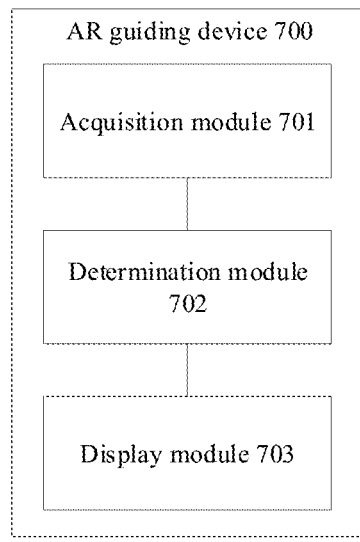
FIG. 7 is a schematic structural diagram of an exemplary AR guiding apparatus according to some embodiments of the present disclosure.

FIG. 7 is a schematic structural diagram of an exemplary AR guiding apparatus according to some embodiments of the present disclosure. As shown in FIG. 7, the AR guiding device 700 includes an acquisition module 701, a determination module 702, and a display module 703.

The acquisition module 701 is configured to obtain the real-time surrounding image and the focus of the user's line of sight in the surrounding image. The determination module 702 is configured to determine the guide sign sequence based on the real-time surrounding image. The display module 703 is configured to display at least one guide animation based on the guide sign sequence. Each guide animation is used to guide the focus of the user's line of sight to move from the current guide sign to the subsequent guide sign.

In some embodiments, the determination module 702 is further configured to per form the image recognition process on the real-time surrounding image to obtain the first set of surrounding feature points. Based on first set of surrounding feature points, the guide sign sequence is determined.

In some embodiments, the determination module 702 further includes an acquisition sub-module configured to obtain the marked sample image corresponding to the real-time surrounding image, a screening sub-module configured to screen the surrounding feature points in the first set of surrounding feature points based on the marked sample image to obtain the second set of surrounding feature points, a first determination sub-module configured to determine the first surrounding image based on the second set of surrounding feature points where the first surrounding image includes at least one image area and the densities of the surrounding feature points in each image area are greater than the density threshold, and a second determination sub-module configured to determine the guide sign sequence based on the at least one image area.

In some embodiments, the screening sub-module is further configured to determine the feature descriptor of each surrounding feature point in the marked sample image to obtain the first set of feature descriptors, determine the feature descriptor of each surrounding feature point in the first set of surrounding feature points to obtain the second set of feature descriptors, determine a similarity between each feature descriptor in the first set of feature descriptors and each feature descriptor in the second set of feature descriptors, and determine each surrounding feature point whose similarity satisfies the similarity threshold as the element in the second set of surrounding feature points.

In some embodiments, the first determination sub-module is further configured to: reconstruct the second surrounding image based on the second set of surrounding feature points, dividing the second surrounding image into at least one image area, determine the density of surrounding feature points in the at least one image area, and determine each image area where the density of the surrounding feature points is greater than the density threshold as the image area of the first surrounding image.

In some embodiments, each image area corresponds to one guide sign. The second determination sub-module is further configured to: sort the at least one image area based on the density of the surrounding feature points in each image area to obtain the observation order of the at least one image area, and determine the order of the guide signs based on the observation order to obtain the guide sign sequence.

In some embodiments, the display module 703 is further configured to repeatedly display the at least one guide animation when the focus of the user's line of sight does not move from the current guide sign to the subsequent guide sign.

In some embodiments, the acquisition module 701 is further configured to: obtain the target position of the focus of the user's line of sight, and obtain the surrounding image at the target position. The display module 703 is further configured to: output the prompt message of moving the position when it is detected that the no surrounding feature point appears at the target position in the surrounding image.

It should be noted that the description about the AR guiding device is similar to the description about the AR guiding method, and also has similar beneficial effects as the AR guiding method. For technical details not described in the embodiments of the AR guiding device, references can be made to the description about the embodiments of the AR guiding method.

In the embodiments of the present disclosure, if the AR guiding method is implemented in the form of software functional modules, the software functional modules may be sold or used as a standalone product, or may be stored in a computer-readable storage medium. Based on this understanding, the technical solution of the embodiments of the present disclosure or the part that contributes to related technologies can be embodied in the form of computer software products. The computer software products are stored in a storage medium and include a plurality of program instructions to make an electronic device (which may be a smart phone with a camera, a tablet computer, etc.) execute all or part of the methods described in various embodiments of the present disclosure. The above-described storage medium includes: a U disk, a portable hard disk, a read-only memory (ROM), a magnetic disk or an optical disk, and other media capable of storing program instructions. Thus, the embodiments of the present disclosure are not limited to any specific combination of hardware and software.

Correspondingly, the present disclosure also provides a computer-readable storage medium storing computer programs. When being executed by a processor, the computer programs implement the processes of the AR guiding method provided by any of the embodiments of the present disclosure.

Correspondingly, the present disclosure also provides an integrated circuit (IC) chip. The IC chip includes programmable logic circuits and/or program instructions. When the IC chip is in operation, the IC chip is used to implement the processes of the AR guiding method provided by any of the embodiments of the present disclosure.

Correspondingly, the present disclosure also provides a computer program product. When the computer program product is executed by a processor of an electronic device, the computer program product is used to implement the processes of the AR guiding method provided by any of the embodiments of the present disclosure.

Figure 8:
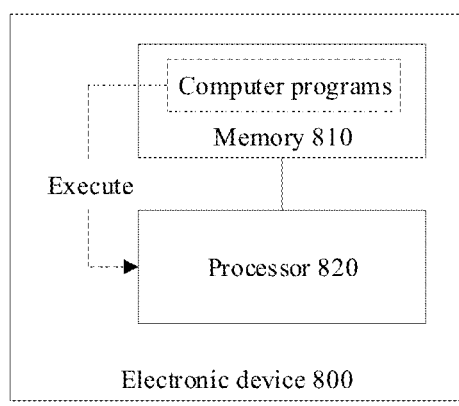
FIG. 8 is a schematic structural diagram of an exemplary electronic device according to some embodiments of the present disclosure.

Based on the same technical concept, the present disclosure also provides an electronic device. The electronic device is used to implement the AR guiding method provided by the embodiments of the present disclosure. FIG. 8 is a schematic structural diagram of an exemplary electronic device according to some embodiments of the present disclosure. As shown in FIG. 8, the electronic device 800 includes a memory 810 and a processor 820 coupled to the memory 810. The memory 810 stores computer programs that can be executed by the processor 820. The processor 820 executes the computer programs to implement the processes of the AR guiding method provided by any of the embodiments of the present disclosure.

The memory 810 is configured to store instructions and applications that can be executed by the processor 820, and store data (e.g., image data, audio data, voice communication data, and video communication data) that will be processed or have been processed by the processor 820 and the modules of the electronic device. The memory 810 may be a flash memory or a random-access memory (RAM).

The processor 820 executes the computer programs to implement the processes of the AR guiding method provided by any of the embodiments of the present disclosure. The processor 820 often controls the overall operation of the electronic device 800.

The above-described processor may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor. The electronic device implementing the above-described processor functions may be other devices, which are not limited by the embodiments of the present disclosure.

The above-described computer-readable storage medium and/or the memory may be a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, an optical disk, a compact disc read-only memory (CD-ROM), or a combination thereof, or may be various electronic devices including any one or combination of the above-described memories, such as a mobile phone, a computer, a tablet computer, a personal digital assistant, etc.

It should be noted that the descriptions about the computer-readable storage medium and the electronic device are similar to the description about the AR guiding method, and also have similar beneficial effects as the AR guiding method. For technical details not described in the embodiments of the computer-readable storage medium and the electronic device, references can be made to the description about the embodiments of the AR guiding method.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not refer to an execution order. The execution order of the processes should be determined by their functions and internal logic, and should not be used to limit the embodiments of the present disclosure. The sequence numbers in the embodiments of the present disclosure are intended for description only, and do not represent the advantages and disadvantages of the embodiments.

It should also be noted that in the specification, relational terms such as first and second are used only to distinguish one entity or operation from another, and do not necessarily require or imply that there is such actual relationship or order between those entities or operations. Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

It should be understood that the disclosed device and method may be implemented in other ways. The device embodiments described above are only illustrative. For example, the division of the module is only a logical function division. In actual implementation, there may be other division methods, such as: multiple modules or sub-modules may be combined, or may be integrated into another system, or some features may be ignored or not implemented. In addition, the mutual coupling, or direct coupling, or communication connection between various modules and sub-modules shown or discussed may be through some interfaces, and the indirect coupling or communication connection of devices or modules may be in electrical, mechanical, or other forms.

The modules described above as separate components may or may not be physically separated, and the components displayed as modules may or may not be physical modules. They may be located in one place or distributed to multiple network units. Part or all of the modules may be selected according to actual needs to achieve the purpose of the solution of the embodiments of the present disclosure.

In addition, each functional module in each embodiment of the present disclosure may be integrated into one processing module, or each module may be used as a single module, or two or more modules may be integrated into one module. The above-described integration may be realized in the form of hardware or in the form of hardware and software combined functional module.

Alternatively, if the above-described integrated modules of the present disclosure are realized in the form of software functional modules and sold or used as standalone products, they may also be stored in a computer-readable storage medium. Based on this understanding, the technical solutions of the embodiments of the present disclosure or the part that contributes to related technologies may be embodied in the form of software products. The computer software products are stored in a storage medium and include a plurality of program instructions to make an equipment automatic test line execute all or part of the methods described in the various embodiments of the present disclosure. The above-described storage medium includes various media capable of storing program instructions, such as removable storage devices, ROMs, magnetic disks, or optical disks.

The methods disclosed in various method embodiments of the present disclosure may be combined arbitrarily to obtain new method embodiments under the condition of no conflict.

The features disclosed in various method or device embodiments of the present disclosure may be combined arbitrarily under the condition of no conflict to obtain new method embodiments or device embodiments.

The above is only the embodiment of the present application, but the scope of protection of the present application is not limited thereto. Anyone familiar with the technical field can easily think of changes or substitutions within the technical scope disclosed in the present application, and should covered within the scope of protection of this application. Therefore, the protection scope of the present application should be determined by the protection scope of the claims The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. An augmented reality (AR) guiding method applied to an AR device, comprising:
    obtaining a real-time surrounding image and a focus of a user's line of sight in the real-time surrounding image;
    performing an image recognition process on the real-time surrounding image to obtain a first set of surrounding feature points;
    obtaining a marked sample image corresponding to the real-time surrounding image;
    screening the surrounding feature points in the first set of surrounding feature points based on the marked sample image to obtain a second set of surrounding feature points;
    determining a first surrounding image based on the second set of surrounding feature points, the first surrounding image including at least one image area, and a density of the surrounding feature points in each image area being greater than a density threshold;
    determining a guide sign sequence based on the at least one image area; and
    displaying at least one guide animation based on the guide sign sequence, each guide animation being used to guide the focus of the user's line of sight from a current guide sign to a subsequent guide sign.

2. The AR guiding method according to claim 1, wherein screening the surrounding feature points in the first set of surrounding feature points to obtain the second set of surrounding feature points based on the marked sample image comprises:
    determining a feature descriptor of each surrounding feature point in the marked sample image to obtain a first set of feature descriptors;
    determining the feature descriptor of each surrounding feature point in the first set of surrounding feature points to obtain a second set of feature descriptors;
    determining a similarity between each feature descriptor in the first set of feature descriptors and each feature descriptor in the second set of feature descripts; and determining the surrounding feature point whose similarity satisfies a similarity threshold as an element in the second set of surrounding feature points.

3. The AR guiding method according to claim 1, wherein determining the first surrounding image based on the second set of surrounding feature points comprises:
   reconstructing a second surrounding image based on the second set of surrounding feature points;
   dividing the second surrounding image into at least one image area;
   determining the densities of the surrounding feature points in the at least one image area; and
   determining each image area where the density of the surrounding feature points is greater than the density threshold as the image area in the first surrounding image.

4. The AR guiding method according to claim 1, each image area corresponding to one guide sign, wherein determining the guide sign sequence based on the at least one image area comprises:
   sorting the at least one image area based on the density of the surrounding feature points in each image area to obtain an observation order of the at least one image area; and
   determining an order of guide signs to obtain the guide sign sequence based on the observation order.

5. The AR guiding method according to claim 1, further comprising:
   in response to the focus of the user's line of sight not moving from the current guide sign to the subsequent guide sign, repeatedly displaying the at least one guide animation.

6. The AR guiding method according to claim 1, further comprising:
   obtaining a target position of the focus of the user's line of sight;
   obtaining a surrounding image at the target position; and
   in response to no surrounding feature point appearing at the target position in the surrounding image, outputting a prompt message of moving a position.

7. An augmented reality (AR) guiding device, comprising:
   a memory storing program instructions; and
   a processor couple to the memory;
   wherein when being executed by the processor, the program instructions cause the processor to:
   obtain a real-time surrounding image and a focus of a user's line of sight in the real-time surrounding image;
   perform an image recognition process on the real-time surrounding image to obtain a first set of surrounding feature points;
   obtain a marked sample image corresponding to the real-time surrounding image;
   screen the surrounding feature points in the first set of surrounding feature points based on the marked sample image to obtain a second set of surrounding feature points;
   determine a first surrounding image based on the second set of surrounding feature points, the first surrounding image including at least one image area, and a density of the surrounding feature points in each image area being greater than a density threshold;
   determine a guide sign sequence based on the at least one image area; and
   display at least one guide animation based on the guide sign sequence, each guide animation being used to guide the focus of the user's line of sight from a current guide sign to a subsequent guide sign.

8. The AR guiding device according to claim 7, wherein when screening the surrounding feature points in the first set of surrounding feature points to obtain the second set of surrounding feature points based on the marked sample image, the processor is further configured to:
   determine a feature descriptor of each surrounding feature point in the marked sample image to obtain a first set of feature descriptors;
   determine the feature descriptor of each surrounding feature point in the first set of surrounding feature points to obtain a second set of feature descriptors;
   determine a similarity between each feature descriptor in the first set of feature descriptors and each feature descriptor in the second set of feature descripts; and
   determine the surrounding feature point whose similarity satisfies a similarity threshold as an element in the second set of surrounding feature points.

9. The AR guiding device according to claim 7, wherein when determining the first surrounding image based on the second set of surrounding feature points, the processor is further configured to:
   reconstruct a second surrounding image based on the second set of surrounding feature points;
   divide the second surrounding image into at least one image area;
   determine the densities of the surrounding feature points in the at least one image area; and
   determine each image area where the density of the surrounding feature points is greater than the density threshold as the image area in the first surrounding image.

10. The AR guiding device according to claim 7, each image area corresponding to one guide sign, wherein when determining the guide sign sequence based on the at least one image area, the processor is further configured to:
    sort the at least one image area based on the density of the surrounding feature points in each image area to obtain an observation order of the at least one image area; and
    determine an order of guide signs to obtain the guide sign sequence based on the observation order.

11. The AR guiding device according to claim 7, wherein the processor is further configured to:
    in response to the focus of the user's line of sight not moving from the current guide sign to the subsequent guide sign, repeatedly display the at least one guide animation.

12. The AR guiding device according to claim 7, wherein the processor is further configured to:
    obtain a target position of the focus of the user's line of sight;
    obtain a surrounding image at the target position; and
    in response to no surrounding feature point appearing at the target position in the surrounding image, output a prompt message of moving a position.

13. A non-transitory computer-readable storage medium storing computer instructions, when being executed by a processor, the computer instructions causing the processor to:
    obtain a real-time surrounding image and a focus of a user's line of sight in the real-time surrounding image;
    perform an image recognition process on the real-time surrounding image to obtain a first set of surrounding feature points;
    obtain a marked sample image corresponding to the real-time surrounding image;

screen the surrounding feature points in the first set of surrounding feature points based on the marked sample image to obtain a second set of surrounding feature points;

determine a first surrounding image based on the second set of surrounding feature points, the first surrounding image including at least one image area, and a density of the surrounding feature points in each image area being greater than a density threshold;

determine a guide sign sequence based on the at least one image area; and display at least one guide animation based on the guide sign sequence, each guide animation being used to guide the focus of the user's line of sight from a current guide sign to a subsequent guide sign.

14. The non-transitory computer-readable storage medium according to claim 13, wherein when screening the surrounding feature points in the first set of surrounding feature points to obtain the second set of surrounding feature points based on the marked sample image, the processor is further configured to:

determine a feature descriptor of each surrounding feature point in the marked sample image to obtain a first set of feature descriptors;

determine the feature descriptor of each surrounding feature point in the first set of surrounding feature points to obtain a second set of feature descriptors;

determine a similarity between each feature descriptor in the first set of feature descriptors and each feature descriptor in the second set of feature descripts; and determine the surrounding feature point whose similarity satisfies a similarity threshold as an element in the second set of surrounding feature points.

15. The non-transitory computer-readable storage medium according to claim 13, wherein when screening the surrounding feature points in the first set of surrounding feature points to obtain the second set of surrounding feature points based on the marked sample image, the processor is further configured to:

determine a feature descriptor of each surrounding feature point in the marked sample image to obtain a first set of feature descriptors;

determine the feature descriptor of each surrounding feature point in the first set of surrounding feature points to obtain a second set of feature descriptors;

determine a similarity between each feature descriptor in the first set of feature descriptors and each feature descriptor in the second set of feature descripts; and determine the surrounding feature point whose similarity satisfies a similarity threshold as an element in the second set of surrounding feature points.

16. The non-transitory computer-readable storage medium according to claim 13, wherein when determining the first surrounding image based on the second set of surrounding feature points, the processor is further configured to:

reconstruct a second surrounding image based on the second set of surrounding feature points;

divide the second surrounding image into at least one image area;

determine the densities of the surrounding feature points in the at least one image area; and determine each image area where the density of the surrounding feature points is greater than the density threshold as the image area in the first surrounding image.

17. The non-transitory computer-readable storage medium according to claim 13, each image area corresponding to one guide sign, wherein when determining the guide sign sequence based on the at least one image area, the processor is further configured to:

sort the at least one image area based on the density of the surrounding feature points in each image area to obtain an observation order of the at least one image area; and determine an order of guide signs to obtain the guide sign sequence based on the observation order.

18. The non-transitory computer-readable storage medium according to claim 13, wherein the processor is further configured to:

in response to the focus of the user's line of sight not moving from the current guide sign to the subsequent guide sign, repeatedly display the at least one guide animation.

19. The non-transitory computer-readable storage medium according to claim 13, wherein the processor is further configured to:

obtain a target position of the focus of the user's line of sight;

obtain a surrounding image at the target position; and in response to no surrounding feature point appearing at the target position in the surrounding image, output a prompt message of moving a position.

* * * * *